United States Patent [19]
Sjolander et al.

[11] Patent Number: 5,727,994
[45] Date of Patent: Mar. 17, 1998

[54] GRINDING CUP AND HOLDER DEVICE

[76] Inventors: Kurt Robert Sjolander, 36 Cameo Street, Oakville, Ontario, Canada, L4J 5Y1; Bo Thomas Sjolander, 120 Bath Street, Oakville, Ontario, Canada, L6K 1A8

[21] Appl. No.: 596,556

[22] Filed: Feb. 5, 1996

Related U.S. Application Data

[63] Continuation-in-part of Ser. No. 383,222, Feb. 3, 1995, Pat. No. 5,639,273.

[51] Int. Cl.⁶ .................. B24B 3/33; B24B 23/02
[52] U.S. Cl. ............................ 451/359; 451/450
[58] Field of Search .................... 451/450, 449, 451/359, 271, 159, 342, 488, 548; 125/20

[56] References Cited

U.S. PATENT DOCUMENTS

| | | | |
|---|---|---|---|
| 3,041,793 | 7/1962 | Shimizu | 451/450 |
| 4,541,758 | 9/1985 | Frank et al. | 125/20 |
| 4,858,388 | 8/1989 | Bice | 451/159 |
| 5,070,654 | 12/1991 | Manqvist et al. | 451/270 |
| 5,193,312 | 3/1993 | Gudmundsson et al. | 451/271 |
| 5,527,206 | 6/1996 | Sjolander et al. | 451/342 |

*Primary Examiner*—Robert A. Rose
*Attorney, Agent, or Firm*—James W. Carson

[57] ABSTRACT

The present invention relates to improvements in devices for use as grinding cups for grinding the hard metal pins or working tips of drill bits and more specifically, but not exclusively, for grinding the tungsten carbide cutting teeth or buttons of a drilling head and the means for detachably connecting the grinding cups to the grinding machine. The grinding cups have top and bottom surfaces and consist of a lower grinding section and an upper body section. The grinding section is formed from a material capable of grinding the tungsten carbide button bits such as a metal and diamond matrix. The peripheral edge in the bottom surface may be bevelled to facilitate the removal of steel from the face of the bit around the base of the button during grinding. A centrally disposed convex recess is formed in the bottom surface of the lower grinding section having the desired profile for the button to be ground. The upper body section has a centrally disposed cavity formed in the top surface of the grinding cup. This cavity is shaped and sized to permit the grinding cup to be detachably connected to the drive member of a grinding machine and rotated during the grinding operation. One or more passageways connect the floor of the cavity in the top surface of the grinding cup with the convex recess in the grinding section to permit a coolant, preferably water, optionally mixed with cutting oil, to be provided to the surface of the button during grinding, through one or more outlets.

24 Claims, 7 Drawing Sheets

GRINDING CUP AND HOLDER DEVICE

This application is a continuation-in-part of our application Ser. No. 08/383,222 entitled GRINDING CUP and HOLDER DEVICE filed Feb. 3, 1995 now U.S. Pat. No. 5,639,273.

BACKGROUND OF THE INVENTION

The present invention relates to improvements in devices for use as grinding cups for grinding the hard metal inserts or working tips of drill bits (percussive or rotary), tunnel boring machine cutters (TBM) and raised bore machine cutters (RBM) and more specifically, but not exclusively, for grinding the tungsten carbide cutting teeth or buttons of a drill bit or cutter and the means for detachably connecting the grinding cups to the grinding machine.

In drilling operations the cutting teeth (buttons) on the drill bits or cutters become flattened (worn) after continued use. Regular maintenance of the drill bit or cutter by regrinding (sharpening) the buttons to return them to substantially their original profile enhances the bit/cutter life, speeds up drilling and reduces drilling costs. Regrinding should be undertaken when the wear of the buttons is optimally a third to a maximum of one-half the button diameter.

Different manual and semi-automatic grinding machines are known for grinding button bits/cutters (see for example U.S. Pat. Nos. 5,193,312; 5,070,654). In a conventional type of machine a grinding cup having the desired profile is rotated at high speed to grind the carbide button and the face of the bit/cutter surrounding the base of the button to return the button to substantially its original profile for effective drilling.

The grinding cups conventionally consist of a cylindrical body having top and bottom surfaces. The bottom or working surface consists of a diamond/metal matrix having a centrally disposed convex recess having the desired profile for the button to be ground. A bevelled rim around the recess removes steel from the face of the bit around the base of the button. An upright hollow stem projects from the top surface.

Water and/or air is provided through the hollow stem and a centrally disposed passageway in the cylindrical body of the grinding cup. A slot or flushing channel in the grinding surface helps disperse the water/air over the button surface being ground. The water/air flushes the surface of the button during grinding. There is a tendency for a nipple to form on the button in the area of the water/air outlet as there is no grinding surface in contact with the button at this point.

The grinding cups are conventionally manufactured by first machining a blank with the upright hollow stem projecting from its top surface. The blank is then pressed into a mould containing a hot diamond/metal mixture. The bottom surface of the blank is heated and bonds to the diamond/metal matrix. Alternatively the diamond/metal matrix can be formed into the grinding section and then bonded either by a shrink fit and/or with adhesives or solder to a blank.

The grinding cups until recently were conventionally held in the grinding machine by inserting the stem in a chuck for detachable mounting of tools. Special tools such as chuck wrenches, nuts and collets were necessary to insert, hold and to remove the grinding cup into and out of the chuck.

To eliminate the need for chuck wrenches etc. the use of a shoulder drive on the grinding cups was recently developed. A diametrically extending recess at the free end of a hollow drive shaft of the grinding machine co-operates with a shoulder or cam means on the adjacent top surface of the grinding cup. The stem of the grinding cup is inserted into the hollow drive shaft and maybe held in place by one or more O-rings either located in a groove in the interior wall of the drive shaft or on the stem of the grinding cup. See for example Swedish Patent No. B 460,584 and co-pending U.S. patent application Ser. No. 08/305,176 both incorporated herein by reference.

Regardless of whether the grinding cup is retained in a chuck or a shoulder drive is utilized, the grinding cup is rigidly connected to the grinding machine and vibrations generated during the grinding operations are directly transferred to the grinding machine. Excessive vibration can result in:

a) High noise levels during grinding;

b) tiring impacts on the operator's hands and arms where manual grinding apparatus is being used;

c) inconsistent grinding quality, less accuracy of button profile and grinding traces.

d) accelerated wear on chuck and grinding machine components.

In co-pending U.S. patent application Ser. No. 08/305,176 a dampening element was inserted in the channel of the hollow drive shaft adjacent the stem of the grinding cup to help reduce vibrations.

SUMMARY OF THE INVENTION

It is an object of the present invention to provide a grinding cup that can be quickly and easily attached and removed from the grinding apparatus.

It is a further object of the present invention to reduce the manufacture costs of grinding cups.

It is a still further object of the present invention to eliminate the necessity to provide a flushing channel in the grinding surface of the grinding cups.

It is a still further object of the present invention to provide a holder device to retain the grinding cups of the present invention that helps minimize vibrations.

It is a still further object of the present invention to provide for improved grinding quality, increased accuracy of button profile and a better finish without grinding traces.

Accordingly the present invention provides a grinding cup having top and bottom surfaces and consisting of a lower grinding section and an upper body section. The grinding section is formed from a material capable of grinding the tungsten carbide button bits such as a metal and diamond matrix. The peripheral edge in the bottom surface may be bevelled to facilitate the removal of steel from the face of the bit around the base of the button during grinding. A centrally disposed convex recess is formed in the bottom surface of the lower grinding section having the desired profile for the button to be ground. The upper body section has a centrally disposed cavity formed in the top surface of the grinding cup. This cavity is shaped and sized to permit the grinding cup to be detachably connected to the output drive shaft of a grinding machine and rotated during the grinding operation. One or more passageways connect the floor of the cavity in the top surface of the grinding cup with the convex recess in the grinding section to permit a coolant, preferably water, optionally mixed with cutting oil, to be provided to the surface of the button during grinding, through one or more outlets.

Another embodiment of the present invention consists of a grinding cup having top and bottom surfaces and consisting of a lower grinding section and an upper body section. A centrally disposed convex recess is formed in the bottom surface of the lower grinding section having the desired profile for the button to be ground. The upper body section is adapted for detachable connection to the output drive shaft of a grinding machine by having for example either an upright hollow stem projecting from the top surface or a centrally disposed cavity in the top surface as described above. Two or more passageways are provided through the body section ending in outlets on the grinding surface of the convex recess in the grinding section to permit a coolant, preferably water, optionally mixed with cutting oil, to be provided to the surface of the button during grinding. The outlets are located off the longitudinal axis of the grinding cup in a manner to avoid dynamic imbalance of the grinding cup. In addition the outlets are not located in those areas on the grinding surface subject to the most wear.

Another embodiment of the present invention consists of a holder device for detachable connection of a grinding cup to a grinding machine, said grinding machine having a pneumatically, hydraulically or electrically driven motor which drives an output shaft. Suitably connected to the output shaft by any conventional means is a holder device of the present invention. The holder device may be an integral extension of the output shaft or a separate attachment. The holder device consists of a rotatable drive member. The drive member is provided with a coaxial passageway extending the length thereof and through which coolant fluid may be directed to a grinding cup supported thereon. One end of the drive member is sized to fit within a corresponding sized cavity in the top surface of the grinding cup. The exterior wall at this end of the drive member is adapted to be retained in the cavity in the grinding cup. The other end of the drive member is adapted for connection to the drive shaft of the grinding apparatus.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF PREFERRED EMBODIMENTS

Figure 1:
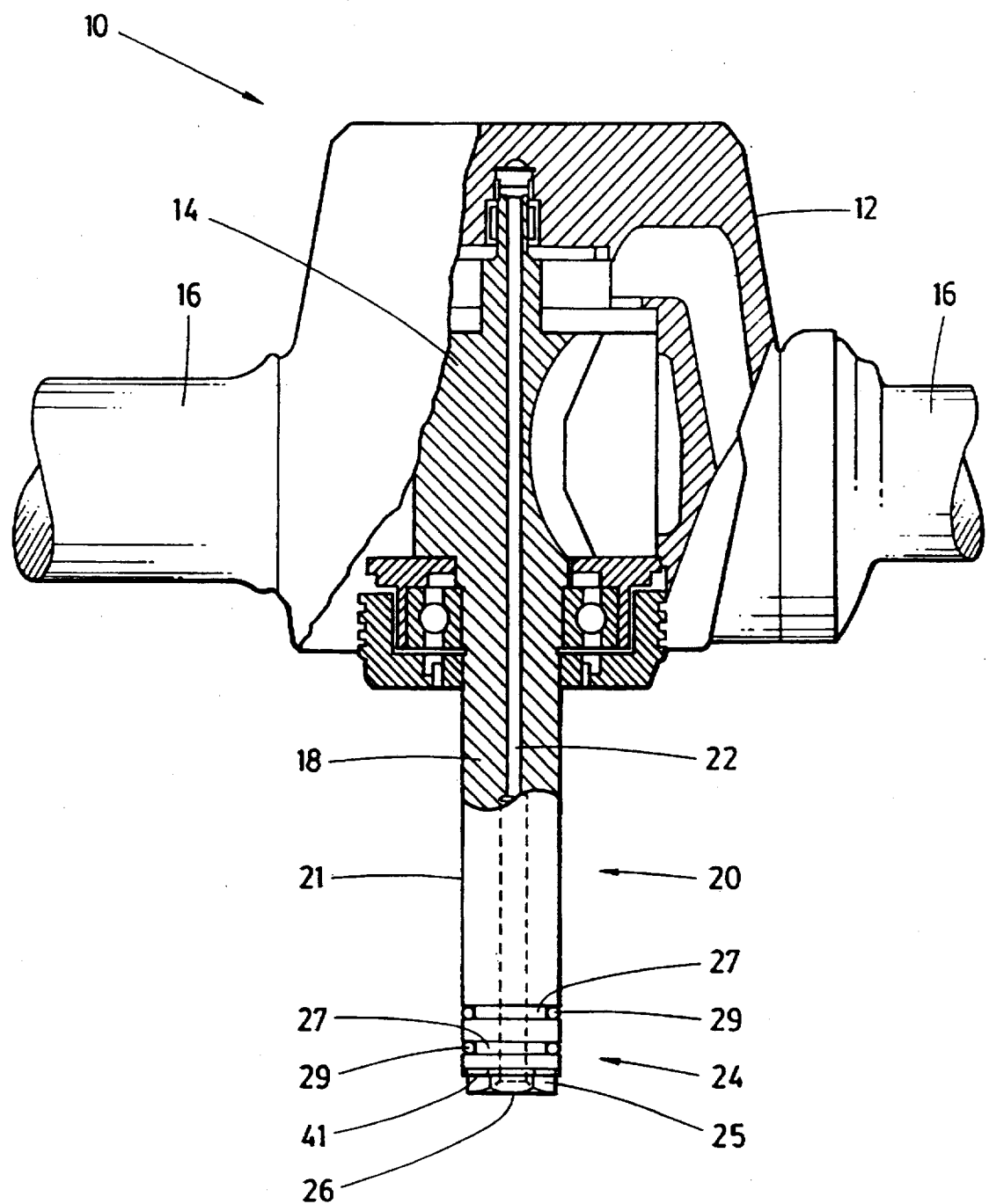
FIG. 1 is a side elevation partly in section of a grinding machine having a single air motor, the rotor of which is extended to form a drive member for holding a grinding cup according to the invention.
Figure 2:
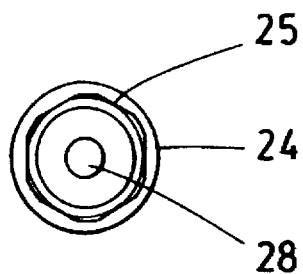
FIG. 2 is a bottom plan view of the drive member of FIG. 1.
Figure 3:
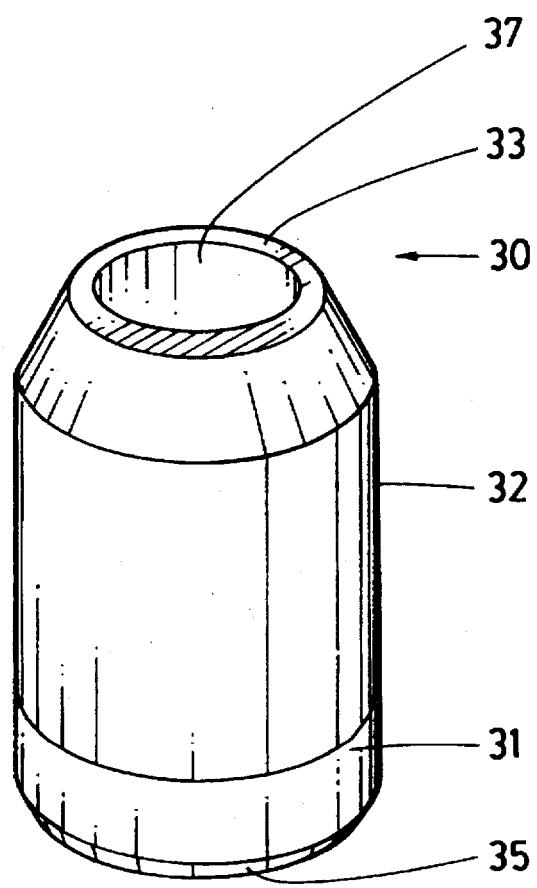
FIG. 3 is an enlarged perspective view of a grinding cup according to the invention to be driven by the drive member of FIG. 1.
Figure 6:
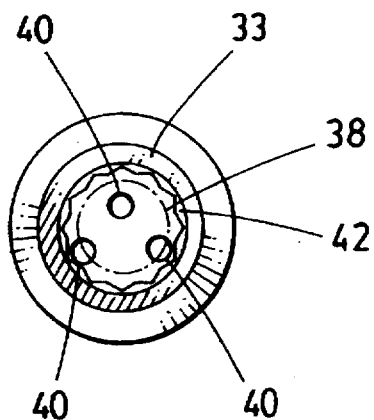
FIG. 6 is a top view of the grinding cup of FIG. 3.
Figure 5:
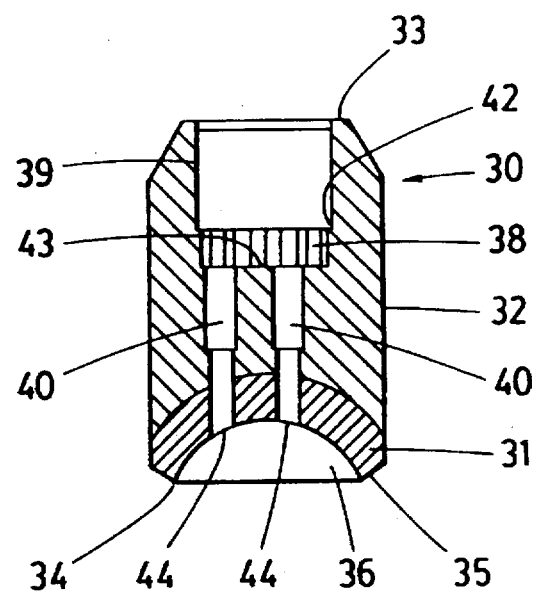
FIG. 5 is a cross section of the grinding cup of FIG. 4 along 5—5.
Figure 4:
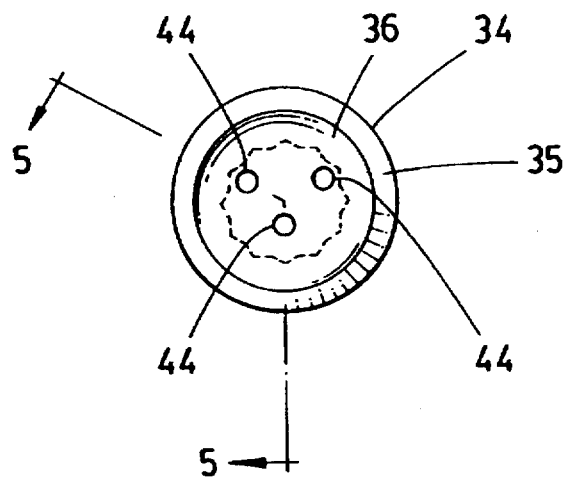
FIG. 4 is a bottom view of the grinding cup of FIG. 3.

Referring to FIGS. 1–6, a grinding machine 10 is illustrated which includes a motor housing or casing 12 within which is suitably supported a rotary motor, the illustrated motor being a pneumatically driven motor 14 adapted to be supplied with compressed air from a suitable source (not shown). The motor can be hydraulic, electric or the like without departing from the substance of the present invention. The dimensions of the casing 12 are such that the grinding machine may be easily handled manually. For the latter purpose, the casing is provided with handles 16 projecting diametrically oppositely outwardly from the casing. The motor 14 drives an output drive shaft 18. Suitably connected to the output drive shaft 18 by any conventional means is a holder device 20. In the illustrated embodiment in FIG. 1, the holder device 20 is an integral extension of the shaft 18 which constitutes a rotatable elongate drive member 21. The shaft 18 and drive member 21 are provided with a coaxial passageway 22 extending the length thereof and through which coolant fluid may be directed to a grinding cup 30 supported thereon, the grinding cup being shown in FIGS. 3–6 and described in detail below. An end portion 24 of the elongate drive member 21, extending from its free end 26, is adapted to fit within a corresponding sized cavity 37 in the top surface 33 of the grinding cup 30. As shown in FIGS. 1 and 2, the exterior wall 25 of elongate drive member 21 in the end portion 24 is adapted to driveably engage within well 38 centrally disposed in the bottom of cavity 37. In the preferred embodiment the exterior wall 25 of drive member 21 is machined to a hexagonal cross section and well 38 as shown in FIGS. 4 and 6 has a corresponding sized twelve point circular cross section. This design permits the free end 26 of drive member 21 to be inserted easily within well 38 without the necessity of specific alignment of the drive member and grinding cup. The grinding cup can simply be pushed on the drive member 21 and rotated until the end 26 of drive member 21 is pushed into well 38. When positioned in well 38, the end 26 of drive member 21 will rotate the grinding cup without slipping when in use. Accordingly the depth of the well 38 and the height of the machined exterior wall 25 should be sufficient to drive the grinding cup without excessive wear. A distance of 4.5 mm to 4.8 mm has been found to be sufficient. Retaining means are provided on the end portion 24 of drive member 21 to detachably retain the grinding cup 30 so that grinding cup 30 will not fly off during use but can still be easily removed or changed after use. In the preferred embodiment the retaining means includes one or more grooves 27 in the exterior wall of the end portion 24 of drive member 21. O-rings or expansion rings 29 are inserted into the grooves 27. When the end portion 24 of drive member 21 is inserted into the grinding cup 30, the O-rings or expansion rings 29 engage the side wall 39 of cavity 37 to hold the grinding cup in place. For greater security, grooves could be formed into side wall 39 and positioned so that the O-rings or expansion rings 29 are engaged by the grooves when the end portion 24 of drive member 21 is fully inserted into cavity 37. As will be apparent, it is desirable that the grooves in the side wall 39 of cavity 37 be slightly larger than the groove 27 whereby the O-ring 29 will remain seated on the shaft as the grinding cup is detached. If just one O-ring 29 is used there may be a tendency for the grinding cup to pivot about the point of contact between O-ring 29 and the side wall 39 of cavity 37. Accordingly in the preferred embodiment at least two O-rings 29 are utilized to eliminate the pivot action and minimize vibration.

To further help eliminate vibration when the grinding cup is in use, a dampening element may be inserted either in cavity 37 in grinding cup 30 or on the end portion 24 of the drive member 21. In the preferred embodiment the dampening element consists of a rubber or nylon washer 41 around a portion of the exterior wall 25 of end portion 24 of drive member 21. This washer 41 abuts against the lip 42 of well 38 in the grinding cup 30. The dampening element can be formed of rubber or other suitable elastomeric material. A second dampening element may also be inserted into the bottom of well 38 so that the free end of the drive shaft compressingly engages the second dampening element. With the cup so mounted, the vibrations generated in the grinding cup 30 during the grinding operation are substantially absorbed by the dampening elements and are thus not transmitted to the handles 16, reducing the fatigue of the operator of the machine and providing the other advantages described herein before. In addition the second washer helps prevent coolant from spraying out around the holder device and the grinding cup.

The opening 28 of passageway 22 has a larger diameter than the passageway so that coolant can be provided to the grinding cup passageways 40. In addition the end 26 of drive member 21 may be provided with a convex profile to facilitate the delivery of coolant to the passageways 40.

FIGS. 1 and 2 illustrate the end portion 24 of the drive shaft machined to a hexagonal cross section however any suitable shape can be used that will drive the grinding cup. Alternatively the end portion 24 could be threaded to screw into cavity 37.

Referring now more particularly to FIGS. 3-6, the grinding cup 30 consists of a lower grinding section 31 and an upper body section 32. In the preferred embodiment the grinding section 31 and body section 32 are integrally connected to form a substantially cylindrical grinding cup having top and bottom surfaces 33 and 34 respectively. The grinding section 31 is formed from a material capable of grinding the tungsten carbide button bits. In the preferred embodiment, the grinding section is formed from a metal and diamond matrix. The peripheral edge 35 in the bottom surface 34 is bevelled to facilitate the removal of steel from the face of the bit around the base of the button during grinding. A centrally disposed convex recess 36 is formed in the bottom surface 34 having the desired profile for the button to be ground. The body section 32 has a centrally disposed cavity 37 formed in the top surface 33 of the grinding cup. This cavity 37 is shaped and sized to permit the grinding cup to be detachably connected to the drive member 21 of the holder device and rotated during the grinding operation. A well 38 is provided in the bottom of cavity 37 into which the end 26 of the drive member 21 is to be inserted. The well 38 as noted above has a cross section adapted in combination with the cross section of the end 26 of drive member 21 to rotate the grinding cup during use. One or more passageways 40 connect the floor 43 of well 37 with the recess 36 in the grinding section to permit a coolant, preferably water, optionally mixed with cutting oil or a water/air mist, to be provided to the surface of the button during grinding, through outlets 44. The coolant prevents excessive heat generation during grinding and flushes the surface of the button of material removed during grinding. In prior devices, which only use a single centrally disposed water outlet often in combination with a slot in the grinding surface, there is a tendency for a nipple to form on the button in the area of the water outlet as there is no grinding surface in contact with the button at this point. In the preferred embodiment illustrated in FIGS. 3-6 three outlets 44 are shown all located off the centre of recess 36 to prevent nipple formation and yet provide efficient coolant dispersal. The outlets are strategically located to avoid a dynamic imbalance by having more mass on one side of the grinding cup from another. In addition the outlets are preferably located outside the areas on the grinding surface that are exposed to the most wear in order to maximize the period of time the grinding cup can be used. Fewer or more outlets can be provided preferably located off centre to prevent nipple formation.

In order to detachably retain the drive member 21 within the cavity 37 retaining means are provided. In the preferred embodiment, as best illustrated in FIG. 1, the retaining means comprises one or more annular grooves 27 formed in the exterior wall 25 of the end portion 24 of drive member 21 in which an O-ring or expansion ring 29 is snugly received. The cup 30 is adapted to be mounted on drive member 21 by inserting the end portion 24 of drive member 21 into the cavity 37. The length of the end portion 24 and the depth of the cavity 37 are such that when the cup 30 is fully mounted on the holding device, the O-ring 29 received within the groove 27 is engaged by the side wall 39 of the cavity 37 as described above. The use of the O-ring 29 to secure the cup 30 on the holder device permits easy mounting and removal of the grinding cup 30 from the holding device 20.

The grinding cups of the present invention can be manufactured in general by the same process conventionally used to make grinding cups: by first forming a blank for the body section by machining, casting, forging, powder metallurgy etc. The blank complete with the cavity 37 in the upper surface and well 38 is then pressed into a mould containing a hot diamond/metal mixture. The bottom surface of the blank is heated and bonds to the diamond/metal matrix. Several means of heating and bonding the diamond/metal matrix to the blank are known. Alternatively the diamond/ metal matrix can be formed into the grinding section and then bonded either by a shrink fit and/or with adhesives or solder to a blank. Alternatively the blank can be formed in two sections and friction welded. This may be particularily appropriate when the cavity in the grinding cup has a varied profile.

Figure 7:
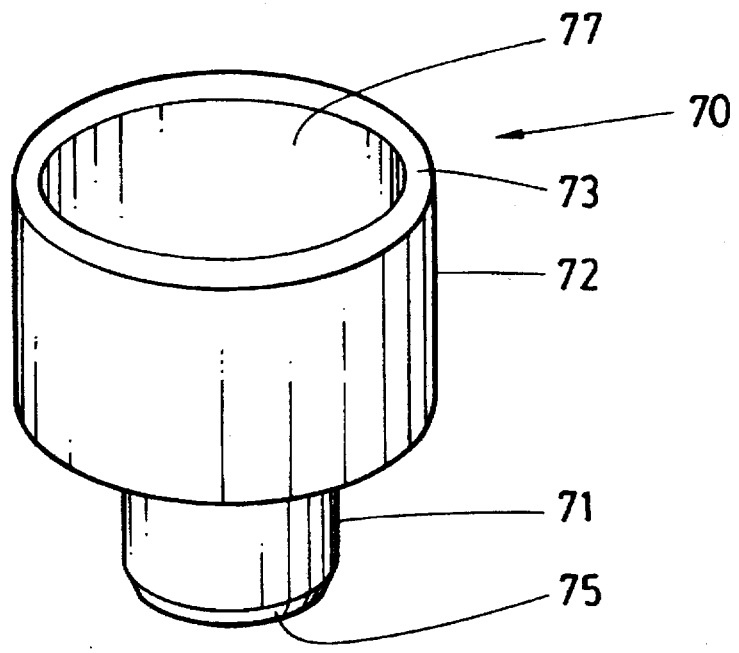
FIG. 7 is an enlarged perspective view of another grinding cup according to the invention for grinding small button bits.
Figure 8:
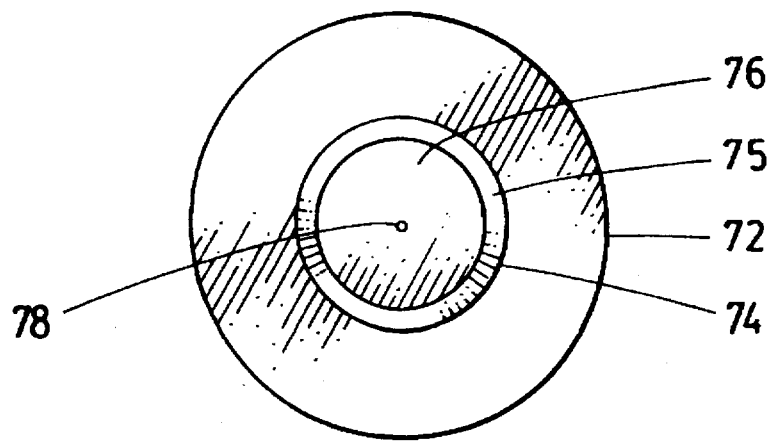
FIG. 8 is a bottom plan view of the grinding cup of FIG. 7.

FIGS. 7 and 8 illustrate a grinding cup 70 according to the present invention for grinding small button bits, having a top body section 72 and a smaller diameter bottom grinding section 71. On smaller bits the buttons may be closer together and accordingly in addition to reducing the diameter of the recess 76 in the grinding section 71 to match the profile of the button to be ground the diameter of the grinding section 71 also has to be reduced to fit between adjacent buttons. However it is desirable to maintain a constant size for the body section 72 for two reasons: (1) the diameter of the body section must be large enough to accommodate the drive member of the holder device and (2) the cavity 77 in the top surface 73 of the grinding cup should be as large as possible so that the drive member gets a good grip on the grinding cup. The bottom surface 74 of the grinding section 71 has a bevelled edge 75 to facilitate removal of the steel around the base of the button.

Figure 9:
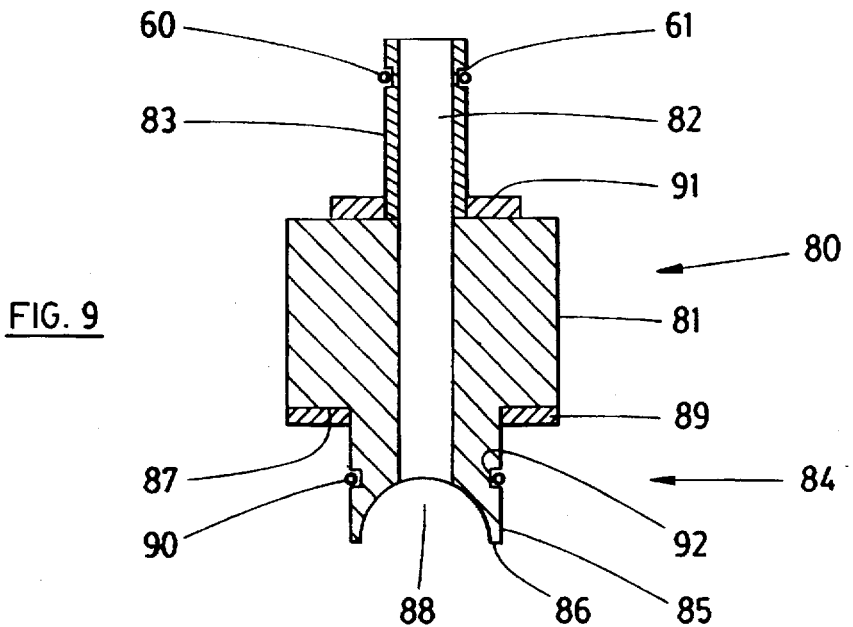
FIG. 9 is an enlarged side cross section of an alternative holder device of the present invention.
Figure 10:
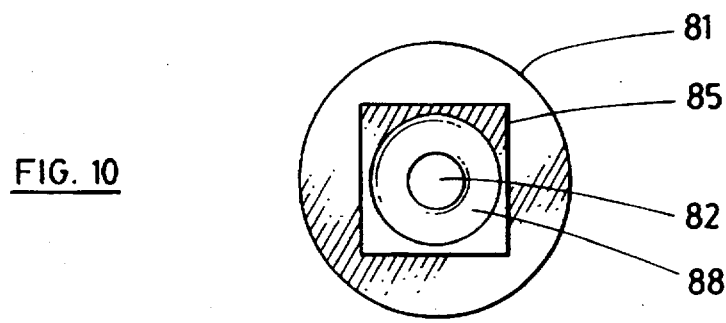
FIG. 10 is a bottom plan view of the holder device of FIG. 9.

In FIGS. 9 and 10 an alternative form of holder device is illustrated for use with a grinding machine which incorporates a diametrically extending recess at the free end of a hollow drive shaft that co-operates with a shoulder or cam means on the adjacent top surface of the grinding cup as described in either Swedish Patent No. B 460,584 or co-pending U.S. patent application Ser. No. 08/305,176. By utilizing a holder device 80 as illustrated in FIGS. 9 and 10 the grinding cups of the present invention can be used without the necessity of replacing the rotor on the grinding machine. The holder device 80 comprises a rotatable drive member 81 having a coaxial passageway 82 along its length. One end 86 of the drive member is adapted to fit within the cavity 37 on the top surface of the grinding cup of the present invention. In the illustrated embodiment, the wall 85 of drive member 21 is machined to a square cross section to fit within a square cavity in the grinding cup. However as noted in connection with FIG. 1 other cross sections are possible that will provide the necessary rotation without slipping of the grinding cup: hexagonal, oval, circular with flattened opposite sides or threaded. A dampening element consisting of an elastic washer 89 is placed around the drive member in the machined end 84 and abuts against shoulder 87. The opening 88 of passageway 82 is expanded to permit coolant to reach the passageways 40 in the grinding cup. A hollow vertical upright stem 83 is centrally located on the top surface of the drive member 81. Cam means or shoulder 91 is provided at the base of the stem 83 and is sized to engage with the diametrically extending recess at the free end of a hollow drive shaft of the grinding machine. The hollow stem is inserted into the hollow drive shaft of the grinding machine and maybe held in place by one or more O-rings 60 either located in one or more grooves 61 on the stem of the grinding cup. The O-ring 60 when the stem 83 is inserted into the hollow drive shaft of the grinding machine engages in a groove or slot in the interior wall of the drive shaft and cam or shoulder 91 fits in the diametrically extending recess at the free end of a hollow drive shaft of the grinding machine. The drive member 81 is equipped with means for retaining the grinding cup. A peripheral groove 92 is provided in the machined wall 85 at end portion 84. An O-ring 90 or expansion clip or spring means is inserted into groove 92. When the drive member 81 is inserted into the cavity 37 of the grinding cup the O-ring 90 engages the side wall 39 of the cavity 37. Alternatively where the stem 83 of the holder device 80 is to be inserted into a chuck on the end of the drive shaft, the O-ring 60 and shoulder 91 may be eliminated.

Figure 11:
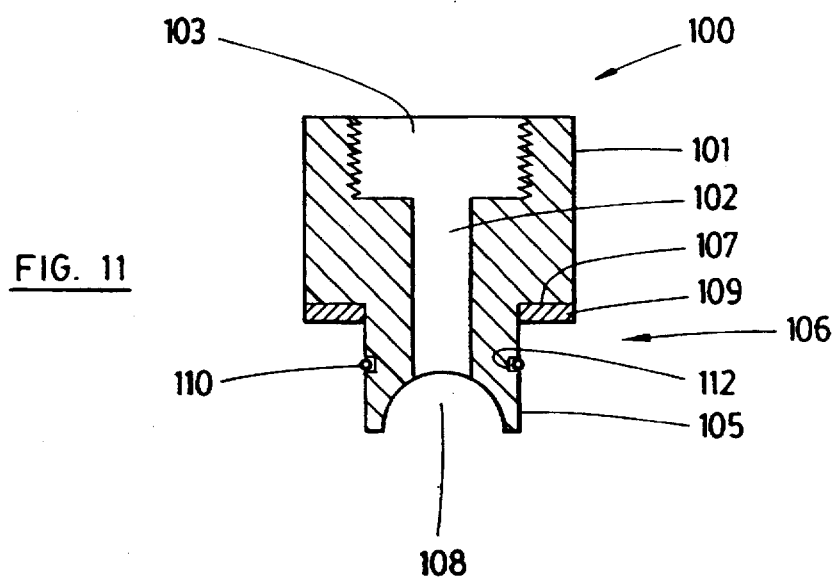
FIG. 11 is an enlarged side cross section of an alternative holder device of the present invention.

In FIG. 11 another alternative form of holder device is illustrated for use with a grinding machine which incorporates a threaded end on the drive shaft to which a chuck is normally connected for holding the grinding cup. By utilizing a holder device 100 as illustrated in FIG. 11 the grinding cups of the present invention can be used without the necessity of replacing the rotor on the grinding machine. The holder device comprises a rotatable drive member 101 having a coaxial passageway 102 along its length. One end 106 of the drive member is adapted to fit within the cavity 37 on the top surface of the grinding cup of the present invention. In the illustrated embodiment, the wall 105 of drive member 101 is machined to a square cross section to fit within a square cavity in the grinding cup. A dampening element consisting of an elastic washer 109 is placed around the drive member in the machined end and abuts against shoulder 107. The opening 108 of passageway 102 is expanded to permit coolant to reach the passageways 40 in the grinding cup. A threaded hole 103 is centrally located on the top surface of the drive member 101 and is coaxial with passageway 102. The holder device can be screwed on to the threaded end of a hollow drive shaft of the grinding machine. The drive member 101 is equipped with means for retaining the grinding cup as in FIG. 9. A peripheral groove 112 is provided in the machined wall 105. An O-ring 110 or expansion clip or spring means is inserted into groove 112. When the end portion 106 is inserted into the cavity 37 of the grinding cup the O-ring 110 engages with the side wall 39 of cavity 37.

Figure 12:
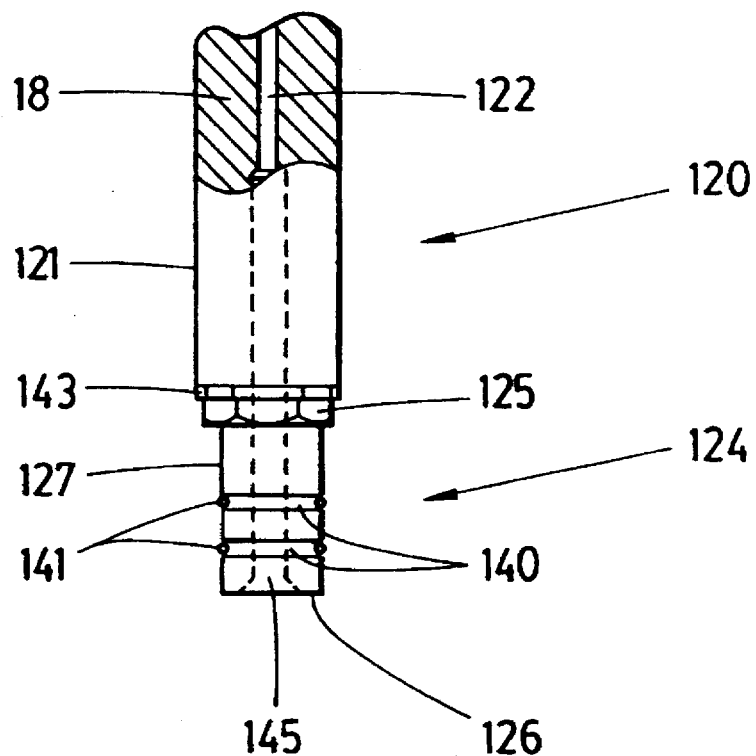
FIG. 12 is a side elevation partly in section of the end of the output drive shaft of a grinding machine having a single air motor, extended to form an alternative drive member for holding a grinding cup according to the invention.
Figure 13:
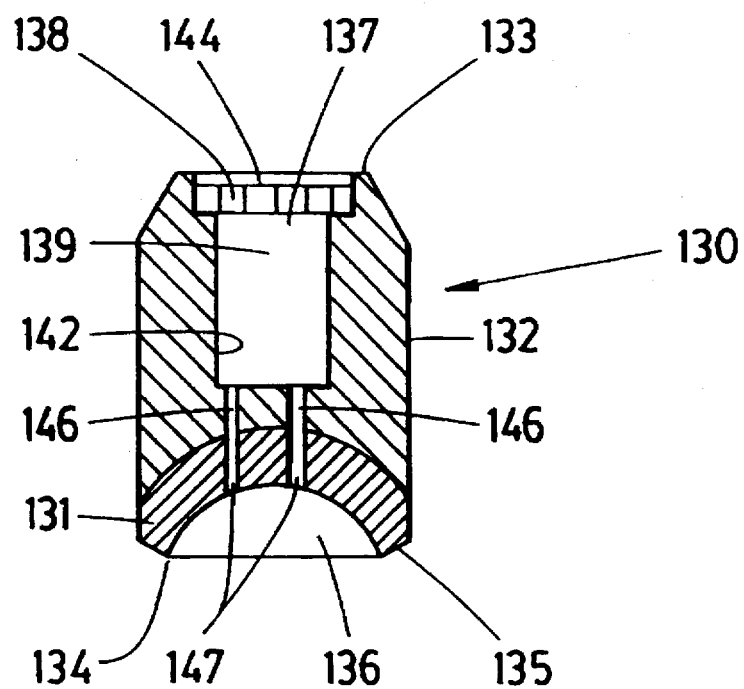
FIG. 13 is a cross section of a grinding cup according to the invention to be driven by the drive member of FIG. 12.

FIGS. 12 and 13 illustrate an alternative configuration for the holder device and grinding cup of the present invention. Suitably connected to the output drive shaft 18 of a grinding machine by any conventional means is a holder device 120. In the illustrated embodiment in FIG. 12, the holder device 120 is an integral extension of the shaft 18 which constitutes a rotatable elongate drive member 121. The shaft 18 and drive member 121 are provided with a coaxial passageway 122 extending the length thereof and through which coolant fluid may be directed to a grinding cup 130 supported thereon, the grinding cup being shown in FIG. 13 and described in detail below. An end portion 124 of the elongate drive member 121, extending from its free end 126, is adapted to fit within a corresponding sized centrally disposed cavity 137 in the top surface 133 of the grinding cup 130. As shown in FIG. 12, the end portion 124 of elongate drive member 121 has an upper drive section 125 and a lower support section 127. The upper drive section 125 is adapted to driveably engage within the top portion 138 of cavity 137. In the preferred embodiment the upper drive section 125 of drive member 121 is machined to a hexagonal cross section and the top portion 138 of cavity 137 in grinding cup 130 has a corresponding sized twelve point circular cross section. This design permits the upper drive section 125 of drive member 121 to be inserted easily within the top portion 138 of cavity 137 without the necessity of specific alignment of the drive member and grinding cup. The grinding cup can simply be pushed on the drive member 121 and rotated until the upper drive section 125 is pushed into the top portion 138 of cavity 137. When thus positioned, the upper drive section 125 will rotate the grinding cup without slipping when in use. Accordingly the depth of the top portion 138 of cavity 137 and the height of the machined exterior wall of upper drive section 125 should be sufficient to drive the grinding cup without excessive wear. A distance of 4.5 mm to 4.8 mm has been found to be sufficient.

To provide better support for the grinding cup and minimize vibration generated axial side load on the grinding cup, the lower support section 127 of drive member 121 is adapted to fit snugly within the bottom portion 139 of cavity 137 in grinding cup 130. In the preferred embodiement both the lower support section 127 and the bottom portion 139 of cavity 137 have a circular cross section slightly smaller in diameter than the drive section 125. Retaining means are provided on the lower support section 127 of drive member 121 to detachably retain the grinding cup 130 so that grinding cup 130 will not fly off during use but can still be easily removed or changed after use. In the preferred embodiment the retaining means includes one or more grooves 140 in the exterior wall of the lower support section 127 of drive member 121. O-rings or expansion rings 141 are inserted into the grooves 140. When the lower support section 127 of drive member 121 is inserted into the grinding cup 130, the O-rings or expansion rings 141 engage the side wall 142 of the bottom portion 139 of cavity 137 to hold the grinding cup in place. For greater security, grooves could be formed into side wall 142 and positioned so that the O-rings or expansion rings 141 are engaged by the grooves when the lower support section 127 of drive member 121 is fully inserted into cavity 137. As will be apparent, it is desirable that the grooves in the side wall 142 of cavity 137 be slightly larger than the groove 140 on the lower support section 127 of drive member 121 whereby the O-ring 141 will remain seated on the support section as the grinding cup is detached. If just one O-ring 141 is used there may be a tendency for the grinding cup to pivot about the point of contact between O-ring 141 and the side wall 142 of cavity 137. Accordingly in the preferred embodiment at least two O-rings 140 are utilized to eliminate the pivot action and minimize vibration.

To further help eliminate vibration when the grinding cup is in use, a dampening element may be inserted either in cavity 137 in grinding cup 130 or on the end portion 124 of the drive member 121. In the preferred embodiment the dampening element consists of a rubber or nylon washer 143 around the top of the upper drive section 125 of end portion 124 of drive member 121. This washer 143 abuts against the lip 144 of the top portion 138 of cavity 137 in the grinding cup 130. The dampening element can be formed of rubber or other suitable elastomeric material. A second dampening element may also be inserted into the bottom portion 139 of cavity 137 so that the free end 126 of the drive member 121 compressingly engages the second dampening element. With the cup so mounted, the vibrations generated in the grinding cup 130 during the grinding operation are substantially absorbed by the dampening elements and are thus not transmitted to the handles 16, reducing the fatigue of the operator of the machine and providing the other advantages described herein before. In addition the second washer helps prevent coolant from spraying out around the holder device and the grinding cup.

The opening 145 of passageway 122 has a larger diameter than the passageway so that coolant can be provided to the grinding cup passageways 146. In addition the free end 126 of drive member 121 may be provided with a convex profile to facilitate the delivery of coolant to the passageways 146.

FIG. 12 illustrates the drive section 125 of end portion 124 of the drive member 121 machined to a hexagonal cross section however any suitable shape can be used that will drive the grinding cup. Alternatively the drive section 125 could be threaded to screw into cavity 137.

Figure 15:
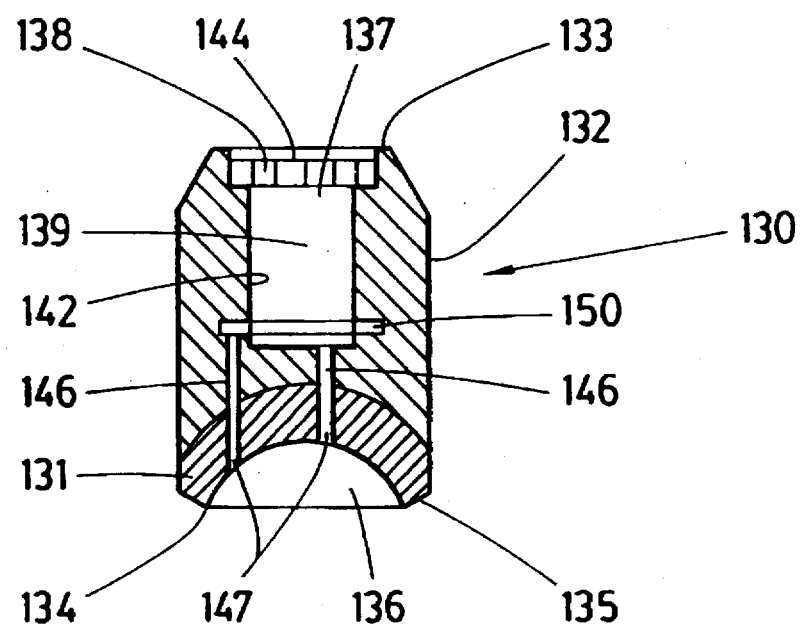
FIG. 15 is a cross section of a grinding cup of FIG. 13 with an alternative location for the water outlets suitable for large diameter grinding cups.

Referring now more particularly to FIG. 13, the grinding cup 130 consists of a lower grinding section 131 and an upper body section 132. In the preferred embodiment the grinding section 131 and body section 132 are integrally connected to form a substantially cylindrical grinding cup having top and bottom surfaces 133 and 134 respectively. The grinding section 131 is formed from a material capable of grinding the tungsten carbide button bits. In the preferred embodiment, the grinding section is formed from a metal and diamond matrix. The peripheral edge 135 in the bottom surface 134 is bevelled to facilitate the removal of steel from the face of the bit around the base of the button during grinding. A centrally disposed convex recess 136 is formed in the bottom surface 134 having the desired profile for the button to be ground. The body section 132 has a centrally disposed cavity 137 formed in the top surface 133 of the grinding cup. This cavity 137 is shaped and sized to permit the grinding cup to be detachably connected to the drive member 121 of the holder device and rotated during the grinding operation. The cavity 137 as noted above has a cross section adapted in combination with the cross section of the end portion 124 of drive member 121 to rotate the grinding cup during use. One or more passageways 144 connect cavity 137 with the recess 136 in the grinding section to permit a coolant, preferably water, optionally mixed with cutting oil or a water/air mist, to be provided to the surface of the button during grinding, through outlets 146. The coolant prevents excessive heat generation during grinding and flushes the surface of the button of material removed during grinding. In prior devices, which only use a single centrally disposed water outlet often in combination with a slot the grinding surface, there is a tendency for a nipple to form on the button in the area of the water outlet as there is no grinding surface in contact with the button at this point. In the preferred embodiment illustrated in FIG. 13 two outlets 146 are shown both located off the centre of recess 136 to prevent nipple formation and yet provide efficient coolant dispersal. The outlets are strategically located to avoid a dynamic imbalance by having more mass on one side of the grinding cup from another. In addition the outlets are preferably located outside the areas on the grinding surface that are exposed to the most wear in order to maximize the period of time the grinding cup can be used. Fewer or more outlets can be provided preferably located off centre to prevent nipple formation. In larger diameter grinding cups it may be necessary to outlets 146 located at a point wider than the diameter of the bottom portion 139 of cavity 137. In this situation as illustrated in FIG. 15 it may be necessary to provide a peripheral recess 150 in the bottom of side wall 142 of cavity 137 so that the coolant can be provided to the passageways 146. In this arrangement the passageways 146 are straight up and down and outlets 147 will remain on the same spot of the grinding surface as the grinding cup becomes worn.

Figure 14:
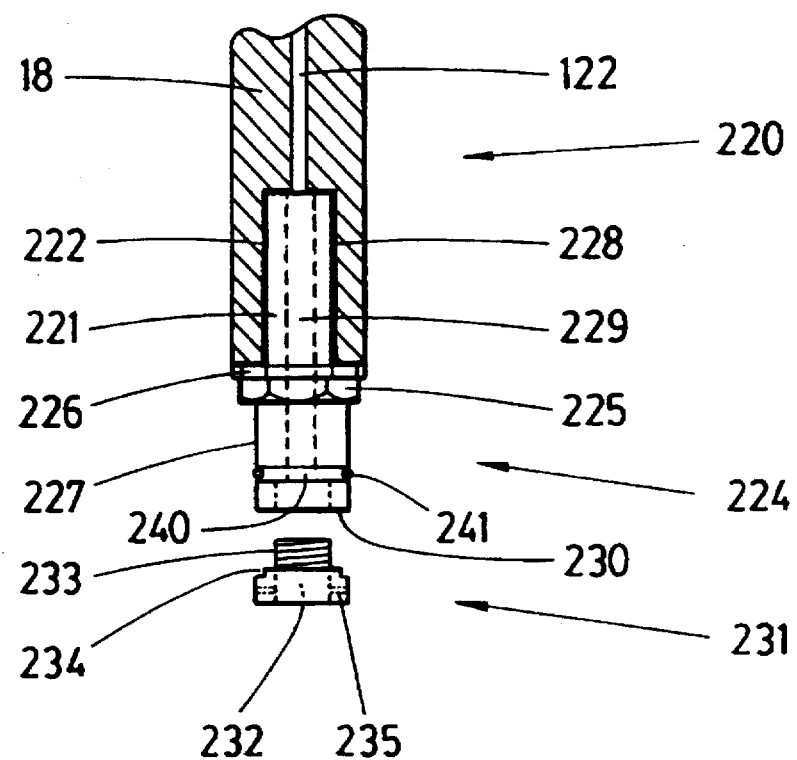
FIG. 14 is a side elevation partly in cross section of an alternative drive member for holding a grinding cup of FIG. 13.

FIG. 14 illustrates another embodiment of the holder device according to the present invention for use with the grinding cup of FIG. 13. The output drive shaft 18 has a co-axial channel 222 extending from its free end 226 and connecting to passageway 122. A holder device 220 consists of a spindle 221 sized to fit within channel 222, an upper drive section 225 and a lower support section 227. A sleeve 228 is inserted into channel 222. The spindle 221 is then pushed into the channel 222. The sleeve 228 is formed of vulcanized rubber or other elasticomeric material and helps reduce vibration and wear on the bearings of the grinding machine. The thickness and hardness of the sleeve 228 will determine how much vibration can be reduced. The upper drive section 225 is adapted to driveably engage within the top portion 138 of cavity 137 of grinding cup 130. As in FIG. 12 the upper drive section preferably has a hexagonal cross section. A co-axial passageway 229 extends through the length of holder device 220 and through which coolant fluid may be directed to the grinding cup. The lower support section 227 has attached at its free end 230 a detachable end part 231 which is threaded into the free end 230. An internal hex socket 232 permits end part 231 to be tightened into the free end 230 of the lower support section 227. Immediately below the threads 233 on end part 231 the end part is adapted by lip 234 so that when attached to the lower support section 237 a peripheral groove is formed similar to groove 140 in FIG. 12 to hold an O-ring. In hand held machines it is the end of the drive member that is most likely to get damaged. By making the end part 231 detachable it eliminates the need to replace the entire output shaft if the end is damaged. The hex socket 232 in end part 231 communicates with passageway 229 to permit coolant to be provided to the grinding cup. Alternatively to provide for larger diameter grinding cups as shown in FIG. 15, end part 231 can be provided with lateral discharge holes 235 that permit coolant to be provided to recess 150 in the grinding cup. The end part 231 can be formed of metal of alternatively a plastic material of sufficient hardness to withstand the rigors involved in grinding but will also act as a vibration dampening element and/or washer to prevent coolant from spraying out around the holder device.

Additions and modifications to the device as described above can be made. For example, it will be apparent that rather than the holder device 20 being an integral extension of output drive shaft 18, the holder device could consist of a separate component adapted to be connected to the end of the output drive shaft 18 by co-operating threads, chuck etc. In addition two or more O-rings could be mounted on the drive member 21 to engage in cooperative recesses formed in the side wall of the cavity 37 in the grinding cup to more securely and more stably connect the grinding cup to the grinding machine. Rather than utilizing an O-ring or expansion ring, the retaining means could consist of one or steel beads spring biased in a slot(s) in the wall 25 of drive member 21 and adapted to engage with a slot in the side wall 39 of cavity 37 in the grinding cup. In place of the elastic washer 41 or dampening element or in supplement thereto a coil spring could be utilized. The shaft opening 22 also can permit coolant air to be passed to the grinding surface of recess 36 to extract heat therefrom. The holder device of the present invention can be used with the hand held grinding machine illustrated in FIG. 1 or with semi automatic grinding apparatus where the grinding head is carried on a robot arm or similar device.

Having illustrated and described a preferred embodiment of the invention and certain possible modifications thereto, it should be apparent to those of ordinary skill in the art that the invention permits of further modification in arrangement and detail.

It will be appreciated that the above description related to the preferred embodiment by way of example only. Many variations on the invention will be obvious to those knowledgeable in the field, and such obvious variations are within the scope of the invention as described and claimed, whether or not expressly described.

We claim:

1. A grinding cup for detachable connection to the output drive shaft of a grinding machine for grinding buttons on drill bits or cutters, said grinding cup having top and bottom surfaces and consisting of a lower grinding section and an upper body section co-axial with said grinding section to form said grinding cup with a centrally disposed recess formed in the bottom surface of the grinding section having the desired profile for the button to be ground said grinding section formed from a material capable of grinding tungsten carbide button bits; said upper body section having a centrally disposed cavity formed in the top surface of the grinding cup, said cavity shaped and sized to permit the output drive shaft of said grinding machine to driveably engage within the cavity; wherein an end portion of the output drive shaft of the grinding machine has a hexagonal cross section and a twelve point circular well is centrally disposed in the bottom of the cavity in said body section, said well and said end portion of the output drive shaft sized to permit the drive shaft to fit within said well to driveably engage the grinding cup and retaining means for detachably connecting the grinding cup to the output drive shaft of the grinding machine.

2. A grinding cup for detachable connection to the output drive shaft of a grinding machine for grinding buttons on drill bits or cutters, said grinding cup having top and bottom surfaces and consisting of a lower grinding section and an upper body section co-axial with said grinding section to form said grinding cup with a centrally disposed recess formed in the bottom surface of the grinding section having the desired profile for the button to be ground said upper body section having a centrally disposed cavity formed in the top surface of the grinding cup, said cavity shaped and sized to permit the output drive shaft of said grinding machine to driveably engage within the cavity; wherein the cavity in the top surface of the grinding cup has an upper section adapted for driveable engagement with the output drive shaft of the grinding machine and a bottom portion adapted to receive support means located on said drive shaft and retaining means for detachably connecting the grinding cup to the output drive shaft of the grinding machine.

3. A holder device for detachable connection of the grinding cups according to claim 1 to a motor driven grinding machine for grinding button bits, said machine having an output shaft, which comprises the combination characterized by:

(a) a rotatable drive member having one end adapted to be secured to said out-put shaft of said grinding machine and an opposite free end adapted to extend outwardly away from said grinding machine, said drive member having a passageway formed therein;

(b) the free end of said drive member adapted to fit within the centrally disposed cavity on the top surface of said grinding cup for driveably engaging said grinding cup to said free end of said drive member, wherein said free end of the drive member is machined to a hexagonal cross section to fit slidably but snugly in a corresponding sized and shaped cavity on the top surface of said grinding cup;

(c) retaining means for operative engagement between said drive member and said cavity for removably retaining said grinding cup on said drive member.

4. A grinding cup according to claim 1 where the grinding section is formed from a steel and diamond matrix.

5. A grinding cup according to claim 4 wherein the grinding section and body section are integrally connected to form a substantially cylindrical grinding cup.

6. A grinding cup according to claim 5 wherein the peripheral edge in the bottom surface is bevelled to facilitate the removal of steel from the face of the bit around the button during grinding.

7. A grinding cup according to claim 6 wherein said retaining means includes one or more O-rings retained in grooves on the end portion of said drive member and adapted to engage the side wall of the cavity in said top surface of the grinding cup.

8. A grinding cup according to claim 7 wherein there are at least two O-rings retained in parallel annular grooves on said drive member.

9. A grinding cup according to claim 8 wherein two or more passageways connect the floor of the cavity in the top surface of the grinding cup with the recess in the grinding section to permit a coolant to be provided to the surface of the button during grinding through one or more outlets.

10. A grinding cup according to claim 9 wherein the outlets for said passageways are located to avoid dynamic imbalance of the grinding cup.

11. A grinding cup according to claim 1 wherein two or more passageways are provided through said grinding section and said upper body section to permit coolant to be provided to the said recess in the bottom surface of the grinding section.

12. A holder device according to claim 3 wherein a dampening element is disposed around the free end of said drive member so that said damping element bears against said top surface of said grinding cup when said drive member is inserted in said cavity.

13. A holder device according to claim 3 wherein said drive member is an extension of the drive shaft of said grinding machine.

14. A grinding cup according to claim 13 where the grinding section is formed from a metal and diamond matrix.

15. A grinding cup according to claim 14 wherein the grinding section and body section are integrally connected to form a substantially cylindrical grinding cup.

16. A grinding cup according to claim 15 wherein the peripheral edge in the bottom surface is bevelled to facilitate the removal of steel from the face of the bit around the button during grinding.

17. A grinding cup according to claim 2 wherein two or more passageways are provided through said grinding section and said upper body section to permit coolant to be provided to said recess in the bottom surface of the grinding section.

18. A grinding cup according to claim 2 wherein said upper section of cavity has a twelve point circular cross section.

19. A grinding cup according to claim 18 wherein the bottom portion of said cavity has a circular cross section slightly smaller in diameter than the upper section of said cavity.

20. A holder device for detachable connection of the grinding cups of claim 2 to a motor driven grinding machine for grinding button bits, said machine having an output shaft, which comprises the combination characterized by:

(a) a rotatable drive member having one end adapted to be secured to said output shaft of said grinding machine and an opposite free end adapted to extend outwardly away from said grinding machine, said drive member having a passageway formed therein;

(b) the free end of said drive member adapted to fit within the centrally disposed cavity on the top surface of said grinding cup for driveably engaging said grinding cup to said free end of said drive member;

(c) retaining means for operative engagement between said drive member and said cavity for removably retaining said grinding cup on said drive member;

wherein said rotatable drive member consists of an upper drive section adapted for driveable engagement with the top portion of the cavity in the top surface of the grinding cup and a lower support section adapted for insertion into the bottom portion of the cavity in the top surface of the grinding cup wherein retaining means for operative engagement between said drive member and said cavity for removably retaining said grinding cup on said drive member are provided on said support section.

21. A holder device according to claim 20 wherein the output drive shaft of the grinding machine is provided with a co-axial channel extending from its free end and the upper drive section of the drive member of said holder device has a co-axial spindle extending from said upper drive section and adapted to be inserted into the channel in said output drive shaft and means for retaining the spindle in said channel.

22. A holder device according to claim 21 wherein said means for retaining the spindle in said channel is an elastomeric sleeve inserted into the channel and into which the spindle is then inserted.

23. A holder device according to claim 22 wherein the sleeve is formed of vulcanized rubber.

24. A holder device according to claim 20 wherein said lower support section has a detachable end part.

* * * * *